(12) United States Patent
King et al.

(10) Patent No.: US 7,403,500 B2
(45) Date of Patent: Jul. 22, 2008

(54) MICRO WAVE CELLULAR ARCHITECTURE

(76) Inventors: Scott William King, 52 Murrumbidgee, Crescent, Bateau Bay, NSW 2261 (AU); Richard Freyer, 68 Drumalbyn Road, Bellevue Hill, NSW 2023 (AU)

( * ) Notice: Subject to any disclaimer, the term of this patent is extended or adjusted under 35 U.S.C. 154(b) by 626 days.

(21) Appl. No.: 10/754,097

(22) Filed: Jan. 7, 2004

(65) Prior Publication Data

US 2004/0190481 A1 Sep. 30, 2004

Related U.S. Application Data

(63) Continuation of application No. 09/642,119, filed on Aug. 21, 2000, which is a continuation of application No. PCT/AU99/00084, filed on Feb. 11, 1999.

(30) Foreign Application Priority Data

Feb. 11, 1998 (AU) ..................................... PP1782

(51) Int. Cl.
*H04Q 7/00* (2006.01)
(52) U.S. Cl. ........................ 370/328; 455/446
(58) Field of Classification Search ................. 370/328; 342/361, 367; 455/562.1, 561, 63.4, 446, 455/447, 426.1, 426.2
See application file for complete search history.

(56) References Cited

U.S. PATENT DOCUMENTS

| 4,747,160 A | 5/1988 | Bossaro |
| 5,594,937 A | 1/1997 | Stiles et al. |
| 5,708,967 A | 1/1998 | Clarke |
| 5,924,039 A | 7/1999 | Hugenberg et al. |
| 6,006,069 A | 12/1999 | Langston |
| 6,141,557 A | 10/2000 | Dipiazza |
| 6,304,762 B1 | 10/2001 | Myers |
| 6,445,926 B1 | 9/2002 | Boch et al. |

FOREIGN PATENT DOCUMENTS

| AU | 29406 | 7/1993 |
| AU | 2940692 | 7/1993 |
| WO | 9312586 | 6/1993 |
| WO | 9531070 | 11/1995 |
| WO | 9746040 | 12/1997 |

*Primary Examiner*—Lewis West
(74) *Attorney, Agent, or Firm*—Ladas & Parry LLP

(57) ABSTRACT

A cell (1), and a transmission network formed from a plurality thereof, for communicating information at directional radio frequencies. The cell includes a first transmitter (2) for transmitting radio frequency information in a first direction (4) to define a first reception footprint (6) substantially within the cell (1). The cell (1) also includes a second transmitter (10) for transmitting radio frequency information in a second direction (12) substantially opposed to the first direction to define a second reception footprint (13) substantially overlapping the first reception footprint (6). The first and second transmitters are disposed at or adjacent a periphery (8) of the cell (1) at positions substantially opposed to each other.

18 Claims, 14 Drawing Sheets

ARRAY OF CELLS FORMING A COVERAGE FOOTPRINT

BACK TO BACK EDGE FED OVERLAID FOR DUAL COVERAGE

CELLS SERVICED TWICE WITH SAME FREQUENCY
FREQUENCY SET (1,2,3,4)

ORTHOGONAL NETWORKS (BROADCAST & BROADBAND OVERLAY)

TYPICAL SPECTRUM ALLOCATION

BROADCAST NETWORK (FM MODULATION)

↘○ VERTICAL POLARISATION   ↙○ HORIZONTAL POLARISATION

ⓘ INDICATES HALF CHANNEL INTERLEAVED TRANSMISSIONS (a)  TANGENTIAL
(b) (c) (d)  i. DISTANCE RATIO
ii. ALTERNATIVE PATH

BROADCAST INTERFERENCE ON BROADBAND OUTBOUND (a) AT POINT (a) THE ALTERNATIVE PATH MAY ALSO BE UNAVAILABLE. IN SUCH AREAS MICRO-CELLS INFILLS COULD BE USED TO PROVIDE ACCESS TO SERVICES.

AT OTHER POINTS ALONG THE LINE OF INTERFERENCE THE ALTERNATIVE PATH MAY BE AVAILABLE IF REQUIRED.

BROADBAND OUTBOUND INTERFERENCE UPON BROADCAST.

X BROADBAND BASE SITE
$B_Y$, $B_Z$ APPROPRIATE MEMBER OF $B_M$, $B_M$ SET
$B_L$, $B_M$, $B_U$ SEGMENT OF 'B' BAND
→ RETURN PATH DIRECTION INDICATOR

NOTE:
FOR A GIVEN BROADBAND BASE SITE ONLY ONE USE OF THE VERTICAL AND HORIZONTAL SET MEMBERS OF THE 'B' BAND MAY BE INCOMING. HENCE ALLOCATION FOR THE EXAMPLES (a) AND (b) ILLUSTRATED WOULD BE ON AN EXCLUSIVITY BASIS IF SITE X IS COMMON TO BOTH.

RETURN PATH TYPICAL SERVICE AREA

FIG. 11(b)

MICRO WAVE CELLULAR ARCHITECTURE

This application is a continuation of application Ser. No. 09/642,119 filed on Aug. 21, 2000, which is a continuation of International Application PCT/AU99/00084 filed on Feb. 11, 1999, which designated the U.S., claims the benefit thereof and incorporates the same by reference.

TECHNICAL FIELD

The present invention relates to Local Multipoint Communication Systems (LMCS), which are also known as Local Multipoint Distribution Systems (LMDS).

BACKGROUND ART

LMCS/LMDS networks comprise a plurality of suitably arranged and configured transmitters operating on a frequency assignment basis. Such networks typically operate using QAM, QPSK, or some other digital modulation scheme. The networks are designed to minimise problems of intersymbol interference (ISI) at receiving sites where two or more signals could potentially be received.

There are a number of frequency assignment techniques known to the industry including:
(1) frequency division, in which an allocated spectrum is divided to form sets of frequencies which are applied to a cell structure in such a fashion that adjacent nearby cells operate on sufficiently different frequencies to avoid ISI;
(2) signal polarisation, which can effectively create or extend the number of available frequencies; and
(3) half channel interleaving, which can be used with some modulation schemes to allow a particular frequency to be reused in nearly adjacent cells.

It has been proposed to carry multiple video channels on such systems. In some countries, one or more bands around 26, 27 or 28 GHz have been reserved, whilst in others, the reserved bands are around 38 to 40 GHz. At these frequencies, the propagation of radio waves is relatively directional.

DISCLOSURE OF THE INVENTION

In a first aspect, the invention provides a transmission network for communicating information at directional radio frequencies, said network comprising:

a broadband network servicing a first area, and including a plurality of first and second transmitters, the direction of transmission of each first and second transmitter lying substantially parallel to a first geographical axis, and a broadcast network servicing a second area substantially overlaying the first area, and including a plurality of third and fourth transmitters, the direction of transmission of each third and fourth transmitter lying substantially parallel to a second geographical axis, the second axis being orthogonal to the first axis, wherein the broadband network transmits in a first frequency band, and the broadcast network transmits in a second frequency band, the first frequency band being substantially the same as the second frequency band.

In a second aspect, the invention provides a transmission network for communicating information at directional radio frequencies, said network comprising:

(a) a plurality of first, second, third and fourth cells, each first, second, third and fourth cell comprising:

a first transmitter for transmitting radio frequency information in a first direction to define a first reception footprint substantially within the cell, the first transmitter being disposed at or adjacent a periphery of the cell, and a second transmitter for transmitting radio frequency information in a second direction substantially opposed to the first direction to define a second reception footprint substantially overlapping the first reception footprint, the second transmitter being disposed at or adjacent the periphery of the cell at a position substantially opposed to the first transmitter, the first, second, third and fourth cells being generally circular or oval in plan, of similar size and transmitting at first, second, third and fourth frequencies respectively, the first transmitter of each first cell being disposed at or adjacent the second transmitter of an adjacent second cell, and the first transmitter of each third cell being disposed adjacent the second transmitter of an adjacent fourth cell.

the plurality of cells being arranged such that the first and second directions, in which the first and second transmitters respectively transmit, are parallel;

(b) a first rectangular array of the first and second cells, the periphery of each first and second cell abutting the peripheries of respective surrounding first and second cells, wherein rows of the first rectangular array in a direction parallel to the first and second directions comprise alternating first and second cells, and each of the rows of the first rectangular array orthogonal to the first and second directions includes either first or second cells, and (c) a second rectangular array of the third and fourth cells, the periphery of each third and fourth cell abutting the peripheries of respective surrounding third and fourth cells, wherein rows of the second rectangular array in a direction parallel to the first and second directions comprise alternating third and fourth cells, and each of the rows of the second rectangular array orthogonal to the first and second directions includes either third or fourth cells, wherein the cells of the second rectangular array are displaced with respect to the cells of the first rectangular array by approximately the radius of a cell in the first direction and by approximately the radius of a cell in a direction orthogonal to the first direction.

In the present specification, references to "frequencies" and "different frequencies" are intended to include signals having different frequencies but the same polarisation, and signals having the same frequency but different relative polarisations. These references are also intended to cover bands of frequencies, as well as single frequencies.

Further, references to a transmission or broadcast "direction" or the like are intended to refer to a general orientation of the transmitter involved. As will be apparent to those skilled in the art, transmission in a given direction is intended to include transmission of a footprint in that direction onto the ground.

BRIEF DESCRIPTION OF DRAWINGS

Various preferred forms of the invention will now be described, by way of example only, with reference to the accompanying drawings, in which:

FIG. 1(*b*) is a schematic view of a cell for use with a network according to a second aspect of the invention;

FIG. 11(b) is a detailed view of portions of networks shown in FIG. 11(a), illustrating the return path for broadband services;

DETAILED DESCRIPTION OF PREFERRED EMBODIMENTS

Figure 1A:
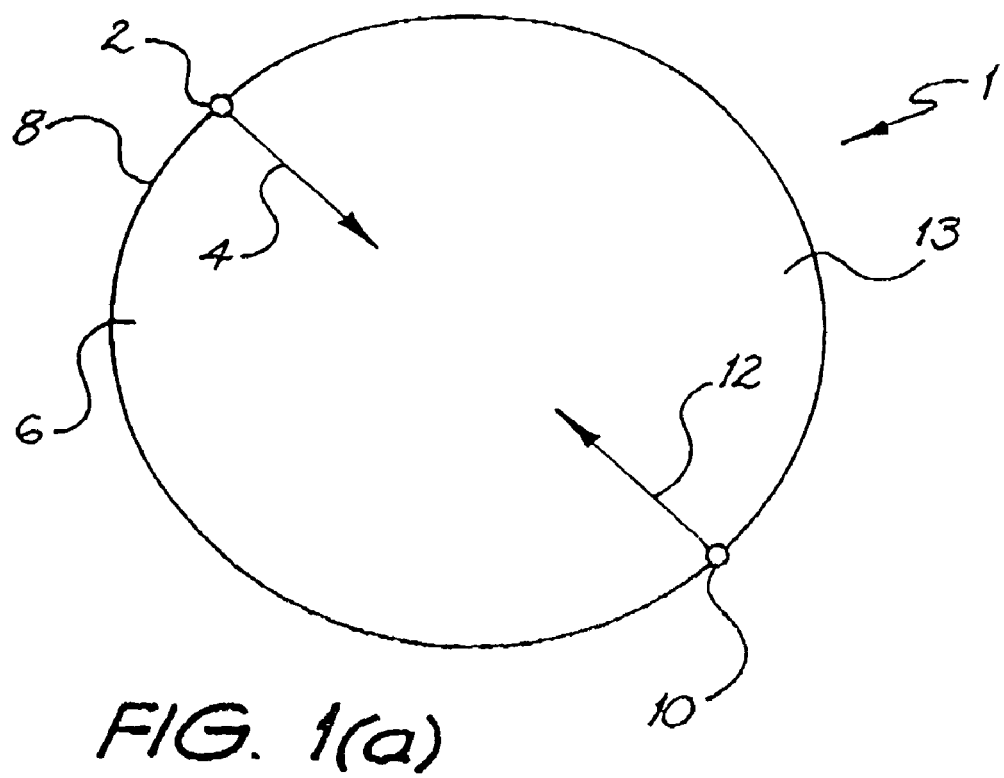
FIG. 1(*a*) is a schematic view of a cell according to a first aspect of the invention.

Referring to the drawings, and FIG. 1(a) in particular, there is provided a cell 1 for use in a transmission network for communicating information at directional radio frequencies. The cell 1 includes a first transmitter 2 for transmitting radio frequency information in a first direction 4 to define a first reception footprint 6 which substantially covers cell 1. The first transmitter 2 is disposed at a periphery 8 of the cell 1. The cell 1 also includes a second transmitter 10 for transmitting radio frequency information in a second direction 12 substantially opposed to the first direction 4, to define a second reception footprint 13 which also effectively covers the cell 1. The second transmitter 10 is also disposed at the periphery 8 of the cell 1, at a position substantially opposed to the first transmitter 2. In the preferred embodiment the reception footprint 13 defined by the second transmitter 10 substantially overlaps the reception footprint 6 defined by the first transmitter 2.

The cell 1 is generally circular in plan, and represents a coverage yielded by a 64 degree horn having a 28 dB front to back ratio and 17 dB sidelobe at 90 degrees. Whilst other cell shapes may be utilised, the circular cell shown is preferred due to the way in which a plurality of such cells may be arranged in a substantially regular array or matrix to form an improved transmission network. It will also be appreciated that the horn parameters given are exemplary only, and that others values could be substituted depending upon the particular implementation of the invention. Turning to FIGS. 2 to 11(b), there is provided a transmission network 14 including a plurality of the cells 1, is the cells 1 being arranged such that the first direction 4 and the second direction 12 are parallel.

Figure 3:
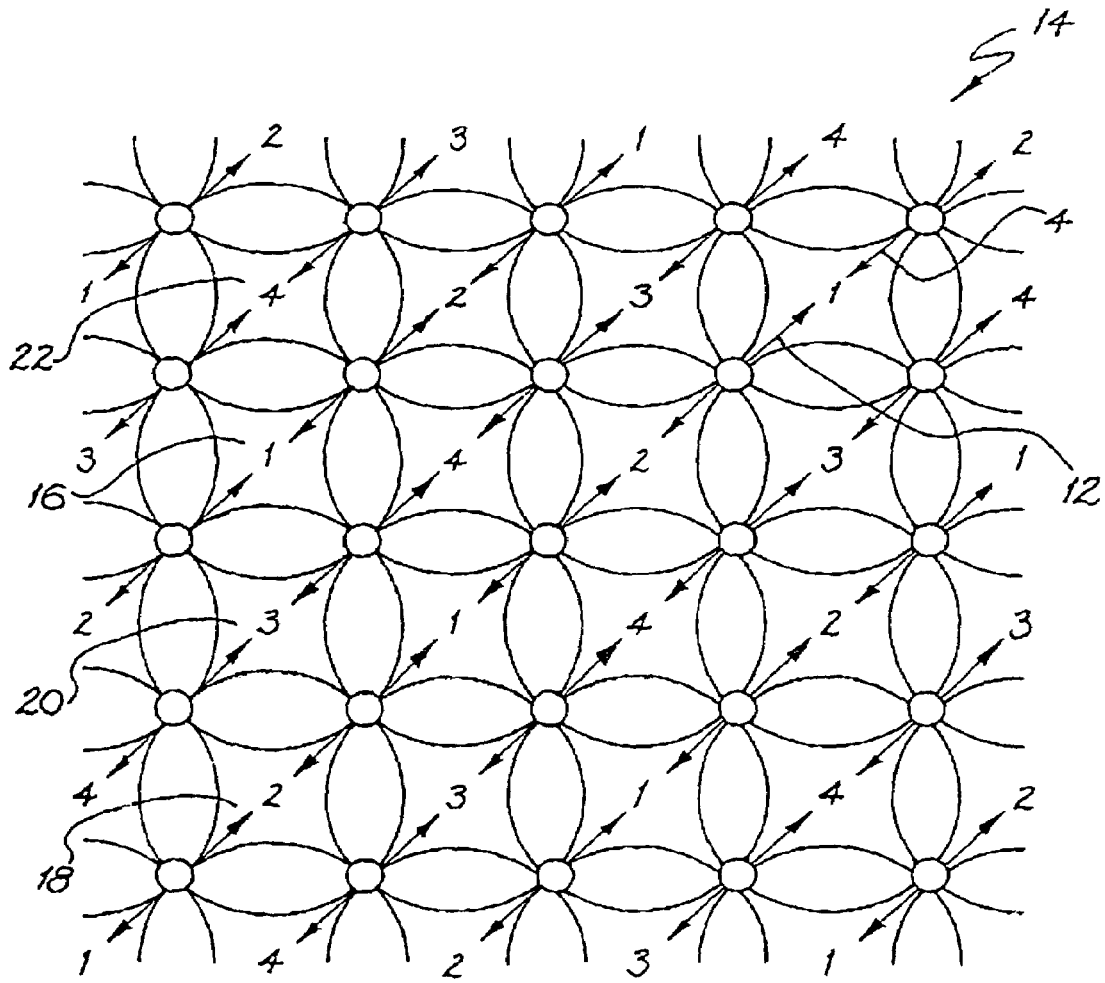
FIG. 3 is a schematic view of the network shown in FIG. 2, illustrating transmitter positions and frequency allocation for each cell.

In a preferred form of the invention shown in FIG. 3, the transmission network 14 includes a plurality of first, second, third and fourth cells 16, 18, 20 and 22. Each of the first, second, third and fourth cells 16, 18, 20 and 22 are generally circular in plan, are of similar size, and transmit at first, second, third and fourth frequencies respectively.

The first transmitter of each first cell 16 is disposed at or adjacent the second transmitter of an adjacent second cell 18 and a first transmitter of each third cell 20 is adjacent the second transmitter of an adjacent fourth cell 22. In this way there is defined a parallel "back to back" edge transmission network.

Figure 12A:
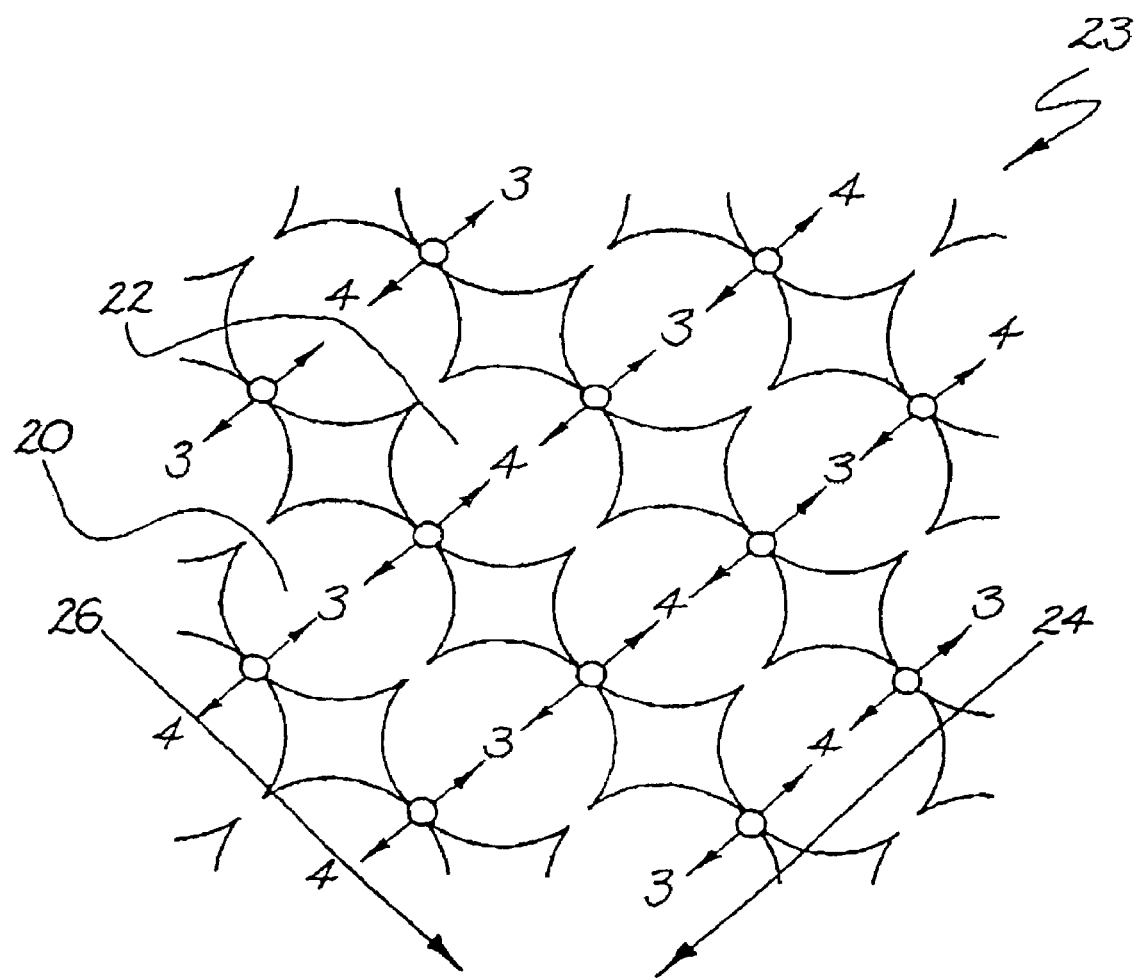
FIG. 12(a) is a schematic view of a plurality of cells arranged to form a first rectangular array.

As best shown in the embodiment of the invention in FIGS. 12(a) and (b), the transmission network includes a first rectangular array 17 of the first and second cells 16 and 18, a periphery of each first and second cell abutting the peripheries of respective surrounding first and second cells. Rows 19 of the first rectangular array 17 in a direction parallel to the first and second directions comprise alternating first and second cells, whilst each of the rows 21 of the first rectangular array 16 orthogonal to the first and second directions consists of either first or second cells.

The transmission network also includes a second rectangular array 23 of the third and fourth cells 20 and 22, the periphery of each third and fourth cell abutting the peripheries of respective surrounding third and fourth cells. Rows 24 of the second rectangular array 23 in a direction parallel to the first and second directions comprise alternating third and fourth cells, and each of the rows 26 of the second rectangular array orthogonal to the first and second directions consist of either third or fourth cells. The cells of the second rectangular array 23 are displaced with respect to the cells of the first rectangular array 16 by approximately the radius of a cell in the first direction, and by approximately the radius of a cell in a direction orthogonal to the first direction.

In a preferred form, the first, second, third and fourth frequencies used by the first, second third and fourth cells respectively are generated from a pair of frequencies or frequency bands. By applying horizontal and vertical polarisation to each of the two frequencies, effectively a full frequency set is generated. This method is only useful at frequencies sufficiently high that polarisation remains generally stable throughout a transmission area. Relatively low frequency transmissions do not allow for stable polarisation.

In a preferred embodiment, the transmission network forms part of a broadband two way network, in which return signals are transmitted from one or more return sites within each cell. To avoid interference, the return signals are transmitted at one or more frequencies other than the first, second, third or fourth frequencies. Depending upon the position of a return site within a cell, it may transmit its return signal towards either the first or second transmitter. A suitable receiver is located adjacent each transmitter to receive returned signals, thereby enabling a true broadband service.

Figure 4:
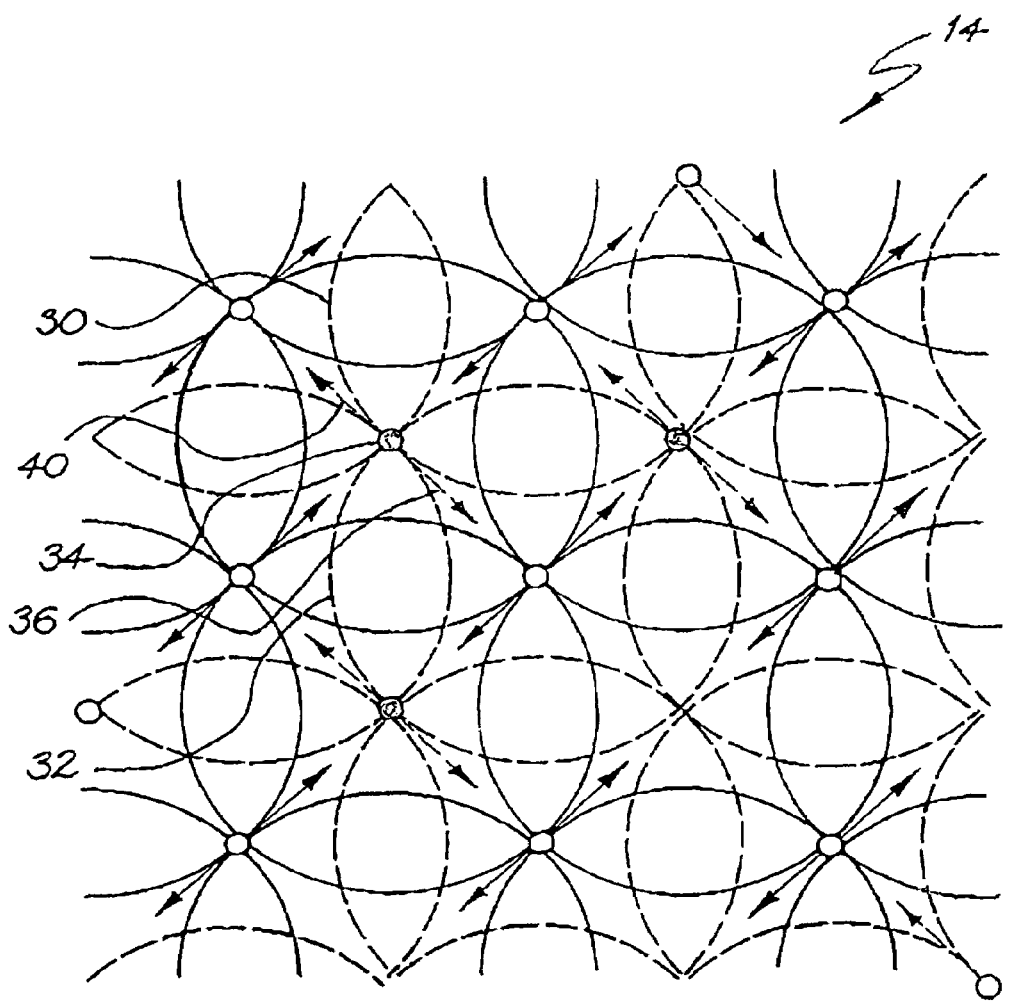
FIG. 4 is a schematic view of the network of FIG. 3 with an overlapping orthogonal broadcast network.
Figure 4:
Figure 4:

Referring to FIGS. 4 and 7 to 10, in a preferred form, the transmission network 14 (shown in dotted lines) further includes an overlaid broadcasting network (solid lines) for one-way broadcast of information. Typically, this information will be multiple video channels or the like, but can also include radio or any other transmitted media. As best shown in FIG. 4, the broadcasting network includes a plurality of fifth cells 30 and sixth cells 32.

Figure 1B:
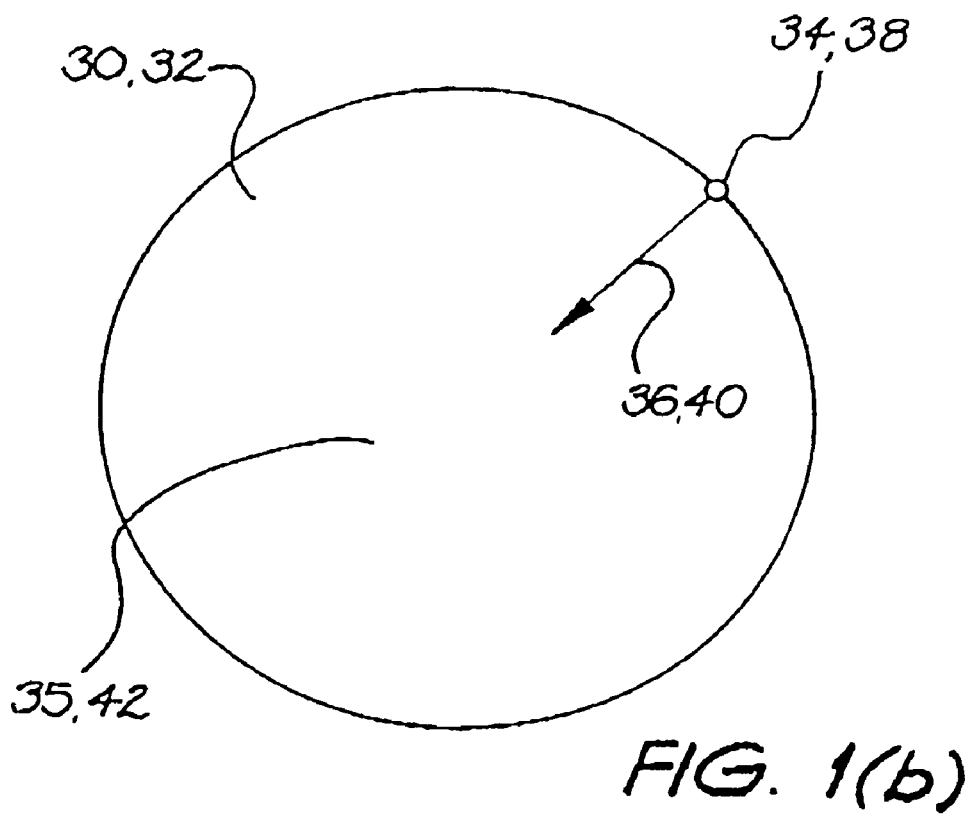
Figure 2:
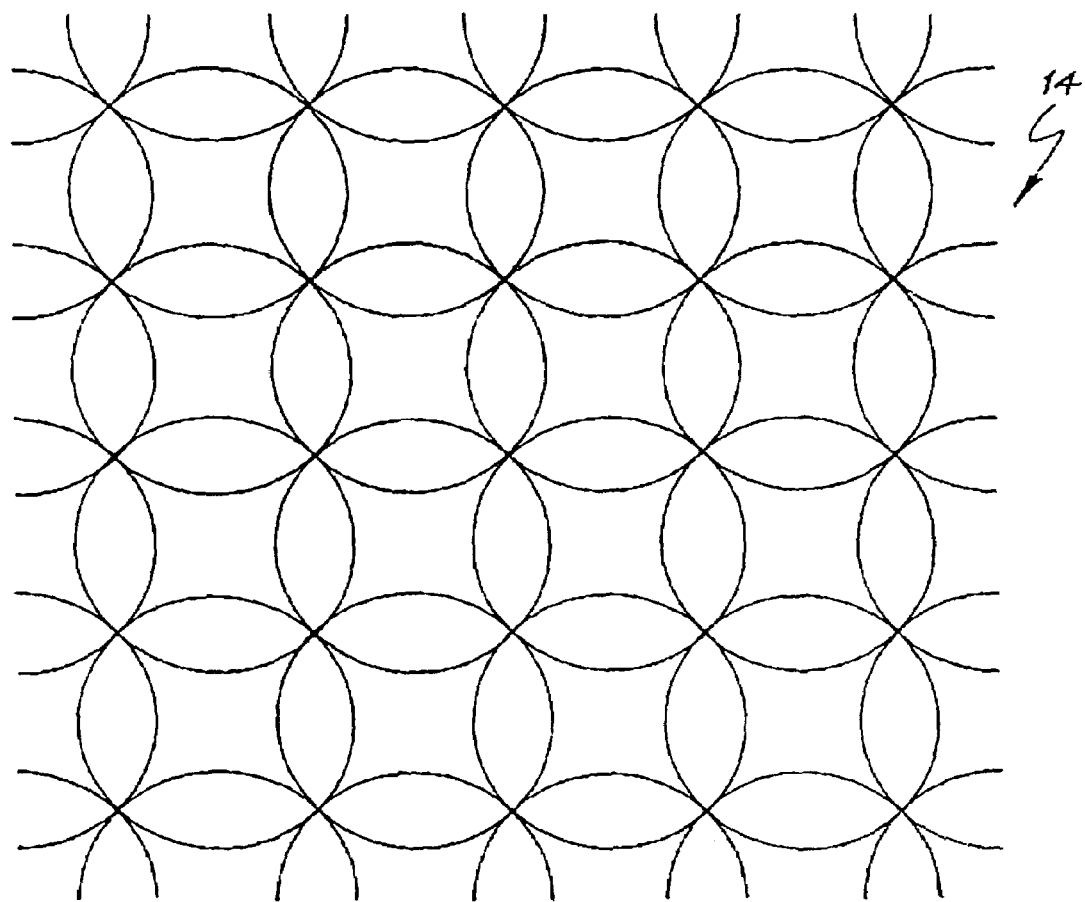
FIG. 2 is a schematic view of a plurality of cells forming a broadband network according to the second aspect of the invention.

Each fifth cell 30 includes a fifth transmitter 34 for transmitting radio frequency information in a third direction 36 orthogonal to the first and second directions onto a reception footprint 35 substantially within the fifth cell. Each fifth transmitter 34 is disposed at a periphery of the corresponding fifth cell 30. FIG. 1(*b*) shows the general arrangement of the fifth and sixth cells 30 and 32.

Each sixth cell 32 includes a sixth transmitter 38 for transmitting radio frequency information in a fourth direction 40 substantially opposite the third direction 36 to define a reception footprint 42 substantially within the sixth cell 32. Each sixth transmitter 38 is disposed at the periphery of the corresponding sixth cell 32.

In the broadcasting network, the fifth transmitter 34 of each fifth cell 30 is disposed adjacent the sixth transmitter 38 of an adjacent sixth cell 32. Furthermore, there is provided a third rectangular array of the fifth and sixth cells 30 and 32, similar to the arrays shown in the FIGS. 12(*a*) and 12(*b*). The peripheries of each fifth cell 30 and sixth cell 32 abut the peripheries of respective surrounding fifth and sixth cells. Rows of the third rectangular array in a direction parallel to the third and fourth directions and comprise alternating fifth and sixth cells 30 and 32. Conversely, each row of the third rectangular array parallel to the first and second directions consists of only fifth cells 30 or sixth cells 32.

Figure 12B:
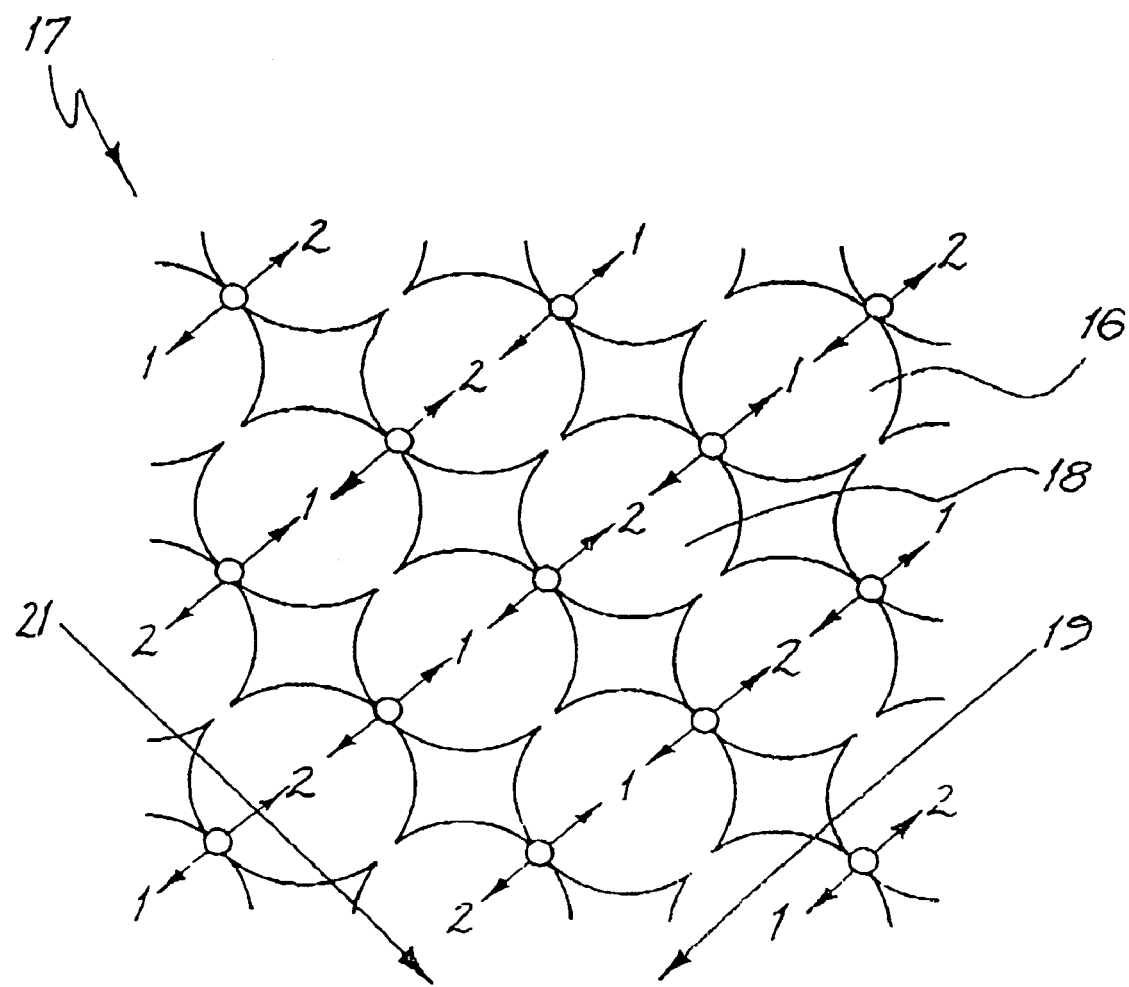
FIG. 12(b) is a schematic view of a plurality of cells arranged to form a second rectangular array configured for use with the first rectangular array shown in FIG. 12(a).

There is also provided a fourth rectangular array of the fifth and sixth cells 30 and 32, once again, in a similar fashion to that shown in FIGS. 12(*a*) and 12(*b*). The periphery of each fifth and sixth cell 30 and 32 abuts the peripheries of respective surrounding fifth and sixth cells. Rows of the fourth rectangular array in a direction parallel to the third and fourth directions comprise alternating fifth and sixth cells 30 and 32. Conversely, each row of the fourth rectangular array parallel to the first and second directions includes only fifth cells 30 or sixth cells 32.

The cells of the fourth rectangular array are displaced with respect to the cells of the third rectangular array by approximately the radius of a cell in the third direction and by approximately the radius of a cell in the first direction.

When the broadcasting network is deployed in conjunction with the transmission network, the cells of the third rectangular array are displaced with respect to the cells of the first rectangular array by approximately the radius of a cell in a first direction. Since the first and second directions are orthogonal to the third and fourth directions, the networks can simultaneously utilise frequencies from similar bands, as discussed in more detail below.

A basic requirement of any transmission network is that a sufficient carrier-to-interference (C/I) ratio is maintained. The necessary C/I ratio varies, depending mainly upon the modulation scheme used. In the case of a digital modulation scheme such as, for example, Quadrature Phase Shift Keying (QPSK), a C/I ratio must exceed about 12 dB. In an urban setting and at the frequencies of interest, this ratio translates to a distance ratio of four for like to like transmissions. Different digital modulation schemes may require correspondingly different C/I ratios.

For an FM modulated network, half channel interleaving can be used to create additional members in a frequency set. However, channel interleaving alone does not provide a sufficiently high C/I ratio. For this reason, a distance ratio of greater than three must be maintained between transmission sittings. In an FM network, like to like signals would require a distance ratio of the order of 15 times. Given relatively flat urban terrain and a restriction on transmission heights of about 20 metres, buildings, terrain and foliage provide sufficient isolation due to blockage of the undesired signal. If this is not the case and a site does not have an alternative path available then micro-cell in-filling can be employed to provide a signal of suitable C/I ratio.

Figure 9:
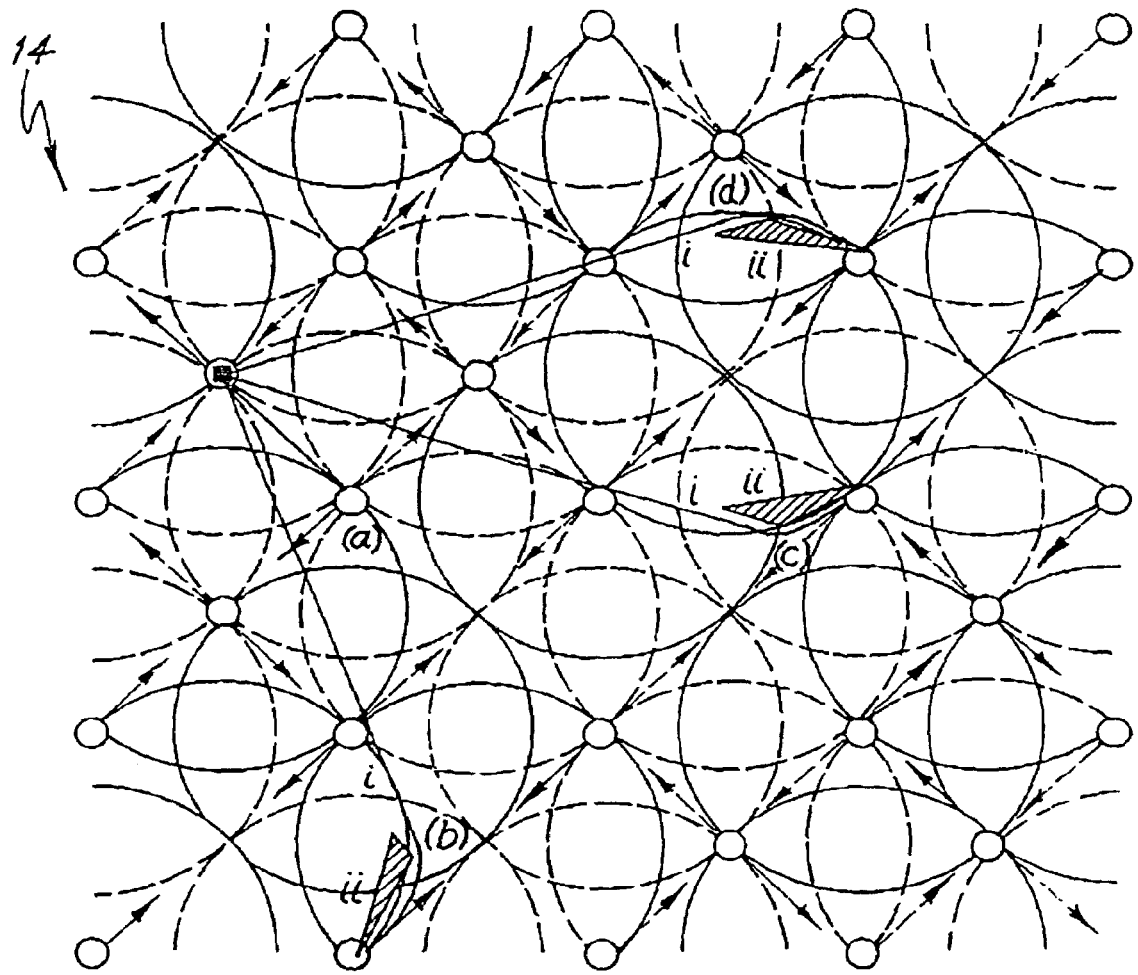
FIGS. 9 and 10 are schematic views showing interference of the broadband outbound and broadcast network respectively.

As discussed above, to overlay the broadcast and broadband networks, an offset approach is used which makes the transmission of the two networks orthogonal. The cell overlap "petal" patterns of the two networks are also orthogonal. As best shown in FIG. 9, signals from a given site in the broadcast network which pass through adjacent or nearly adjacent sites in the broadband outbound network are either tangential to that network, or the distance ratio exceeds that required for in this case, QPSK modulation. In some cases, an alternative path exists to the other site servicing the broadband services with a given cell.

Figure 10:
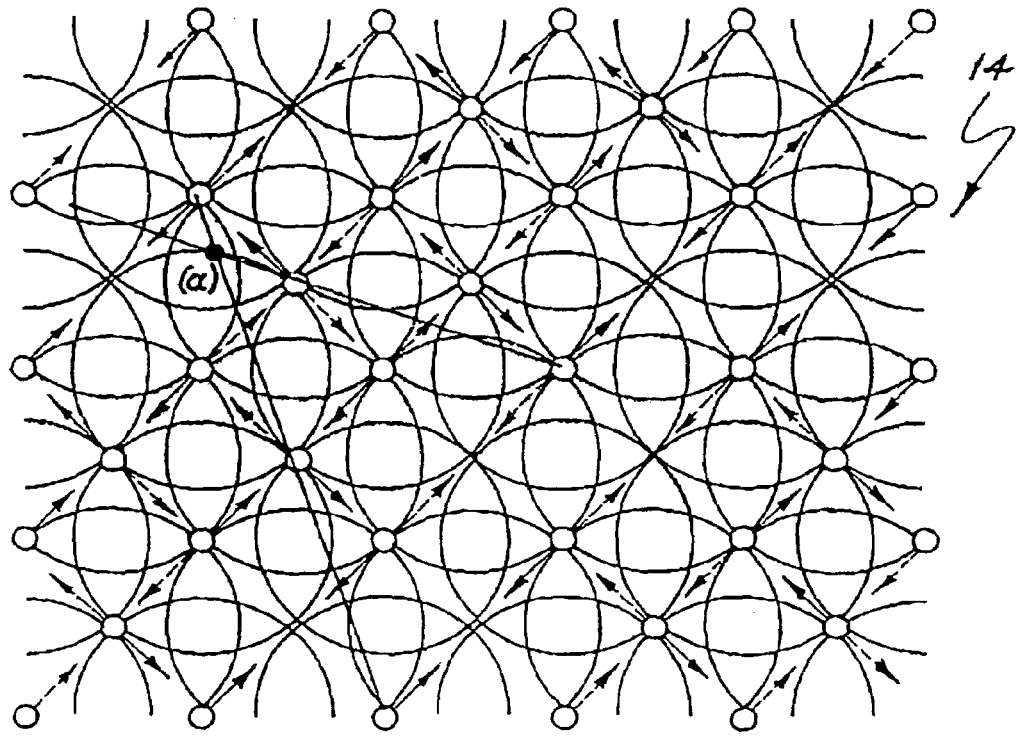

A similar examination of broadband outbound transmissions on the Broadcast service shows that an alternative path exists in the majority of circumstances where interference might otherwise exist (see FIG. 10). Where no alternative path is available, perhaps due to terrain or urban structures, micro-cell in-fills may be used to provide a suitable signal.

A return signal for the broadband service can potentially originate from any point within a cell, requiring that the receive antenna at the corresponding transmission site be omnidirectional. This means that directionality cannot be relied upon to increase the C/I ratio in relation to other signals being broadcast through the network. A practical solution to this problem has been to allocate an exclusive spectrum for the return path. The design of the return path network is therefore independent of both the broadcast network and the broadband outbound network, and can only interfere with itself if it reuses its allocated frequencies in the reserved spectrum. In any case, frequencies used for return paths can not simultaneously be used to provide another return path to the same transmission site. This being the case the network as outlined in FIG. 11(*a*) & 11(*b*) is presented. Given the symmetry of the network it can be derived that the return network within each cell services an area of:

$$A = d^2/4 \text{ (where } d = \text{the diameter of the cell)}$$

Given:
  HH=1,500
  P=50%
  S=2 (one telephone and one internet service)
  d=2 km where
  HH=household density per square kilometre
  P=penetration or uptake rate for services
  S=average number of 64 Kbit services provided
  QPSK modulation yields 2 Mbit (E1) data channel per 2 MHz of spectrum 30×64 Kbit services per E1 channel then the bandwidth required for the broadband return path is: B=100 MHz Given a spectrum allocation of 1 GHz, the following allocation is possible:
  A band: 850 MHz
  B band: 100 MHz
  Reserved for future use: 50 MHz Therefore a 42 channel FM NTSC or 25 channel FM PAL broadcast service could be supported. As the broadband service requires only 100 MHz then 650 MHz of the A band could be used for return links (polarisation is also possible) to form clusters of cells with the central node of the cluster interconnecting with a Broadband backbone (refer to FIG. 6).

Other configurations are possible. Assuming the broadcast service is digital, or fewer analog channels are required, and each transmission point in the broadband service is interconnected to the Broadband backbone then it is plausible that the broadband data rate available per square kilometre may be derived from:

$$d^2 = 1{,}333 \text{ Mbit (for QPSK, where d is diameter of cell)}$$

Therefore for d=2 km, a 333 Mbit data rate is available.

Figure 5:
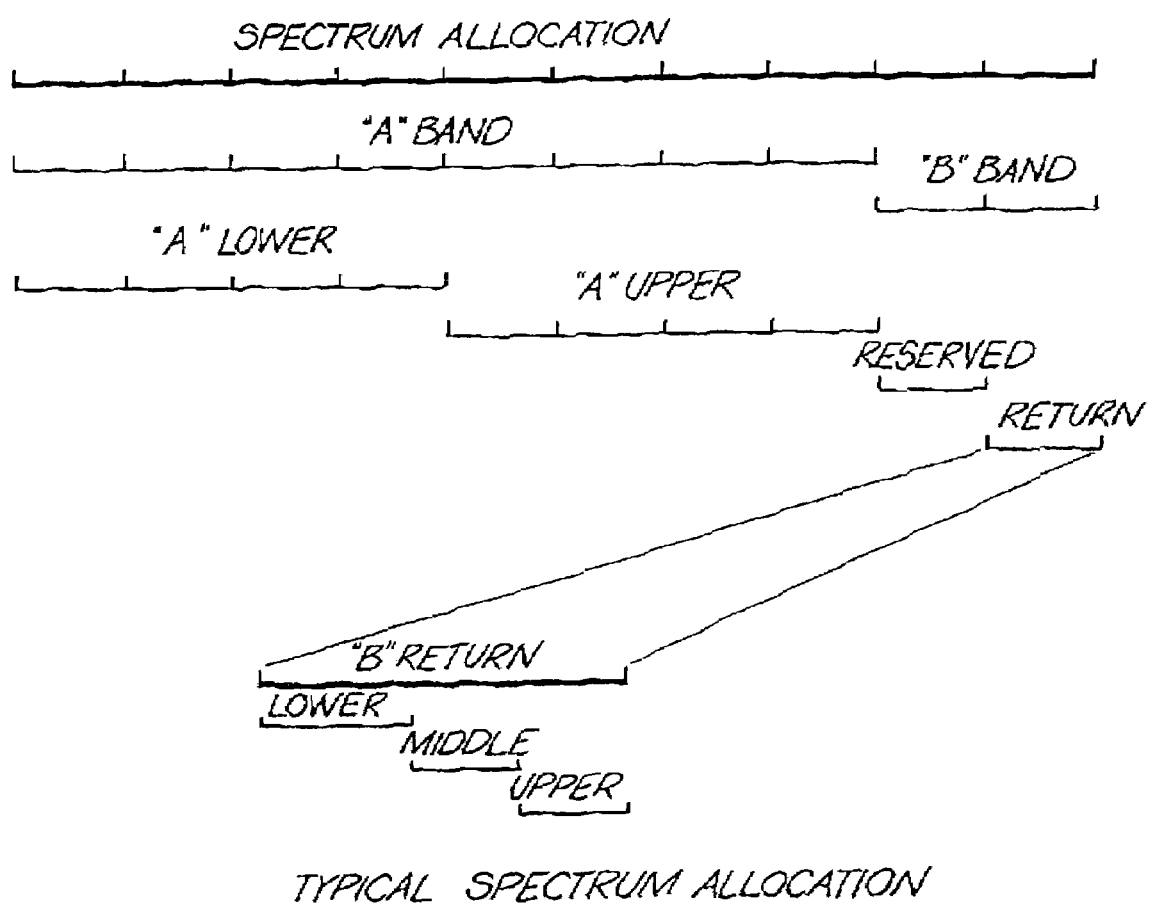
FIG. 5 is a simplified graph showing exemplary spectrum allocations for the network shown in FIG. 4.

The frequency sets in the preferred form of the invention are derived from the allocated spectrum on the following basis:

Broadcast Service;

$A_V$ A band with Vertical Polarisation
$A_H$ A band with Horizontal Polarisation
$A_{VI}$ A band with Vertical Polarisation and Half Channel Interleave
$A_{HI}$ A band with Horizontal Polarisation and Half Channel Interleave Broadband Service Outbound Transmission:

$A_{LV}$ Lower half of the A band with Vertical Polarisation
$A_{LH}$ Lower half of the A Band with Horizontal Polarisation
$A_{UV}$ Upper half of the A Band with Vertical Polarisation
$A_{UH}$ Upper half of the A Band with Horizontal Polarisation Broadband Service Return Path Transmission:

$B_{LV}$ Lower portion of the B band with Vertical Polarisation
$B_{MV}$ Middle portion of the B band with Vertical Polarisation
$B_{UV}$ Upper portion of the B band with Vertical Polarisation
$B_{LH}$ Lower portion of the B band with Horizontal Polarisation
$B_{MH}$ Middle portion of the B band with Horizontal Polarisation
$B_{UH}$ Upper portion of the B band with Horizontal Polarisation This allocation is shown in FIG. 5

Figure 6:
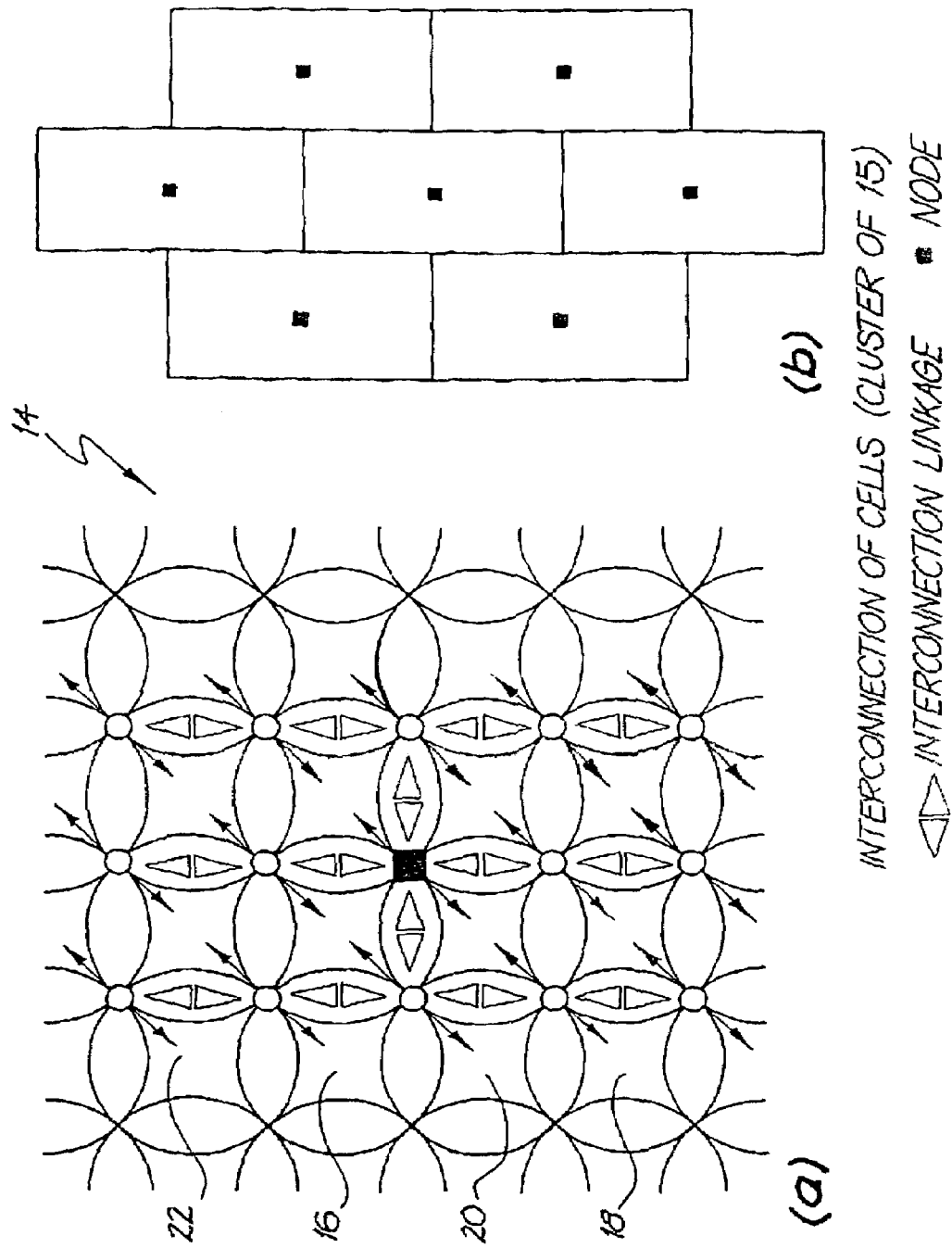
FIG. 6(a) is a schematic view showing interconnection of a plurality of cells to form a cluster.
FIG. 6(b) is a schematic view showing tessellation of multiple clusters such as those shown in 6(a) to form a network of clusters.
Figure 7:
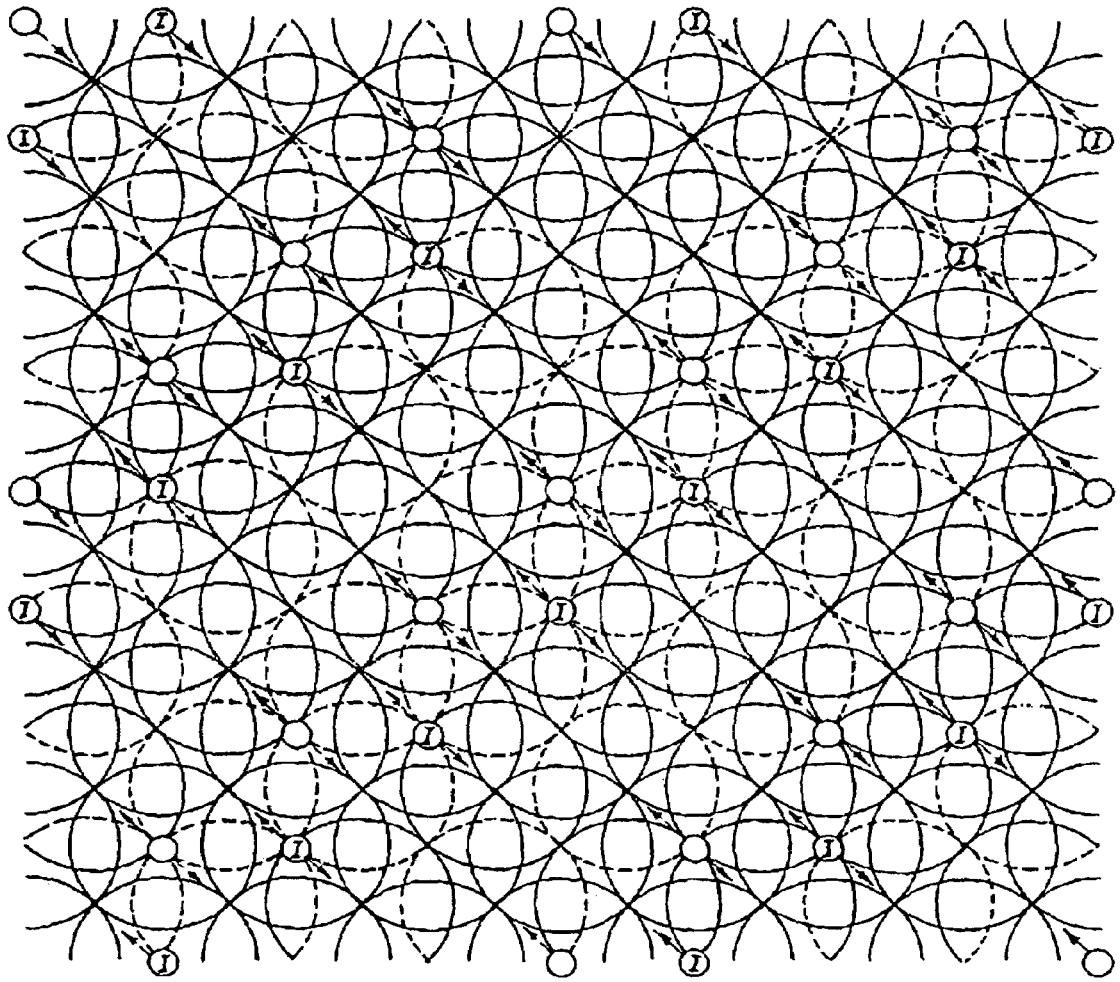
FIG. 7 is a schematic view showing a broadcast network overlaying the broadband network of FIG. 3, the broadcast network using FM modulation.
Figure 8:
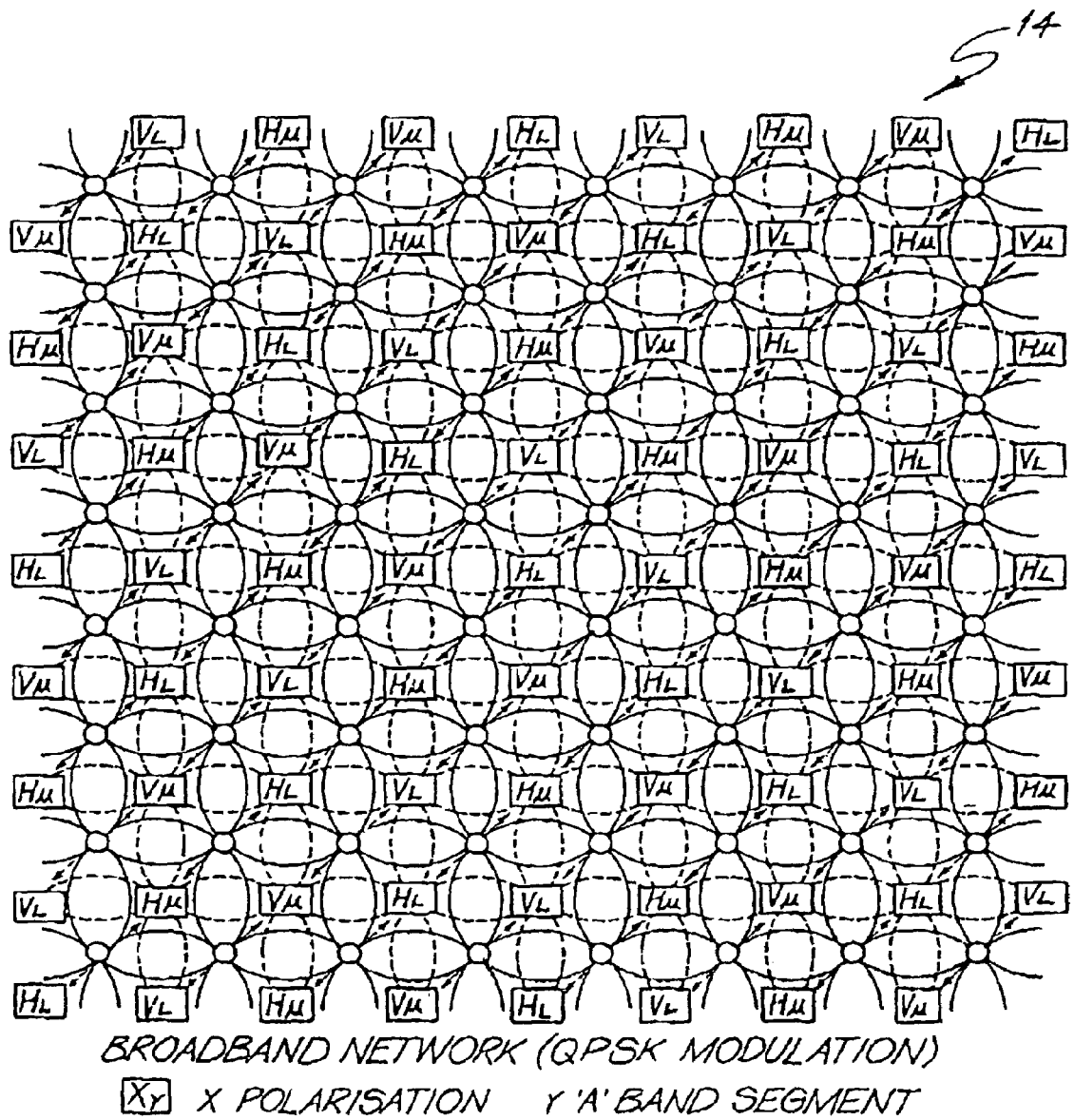
FIG. 8 is a schematic view of broadband network such as that shown in FIG. 2, in which frequency assignment of the spectrum shown in FIG. 5 is made.

As shown in FIG. 6, cells may also be clustered to form a node interconnection point, assuming the to/from relay links are also QPSK modulated. Of note is the offsetting of the clusters in order to ensure the concentrated links from/to the node do not align with an adjacent cluster as the distance ratio would not provide sufficient carrier to interference (C/I) isolation.

Figure 11A:
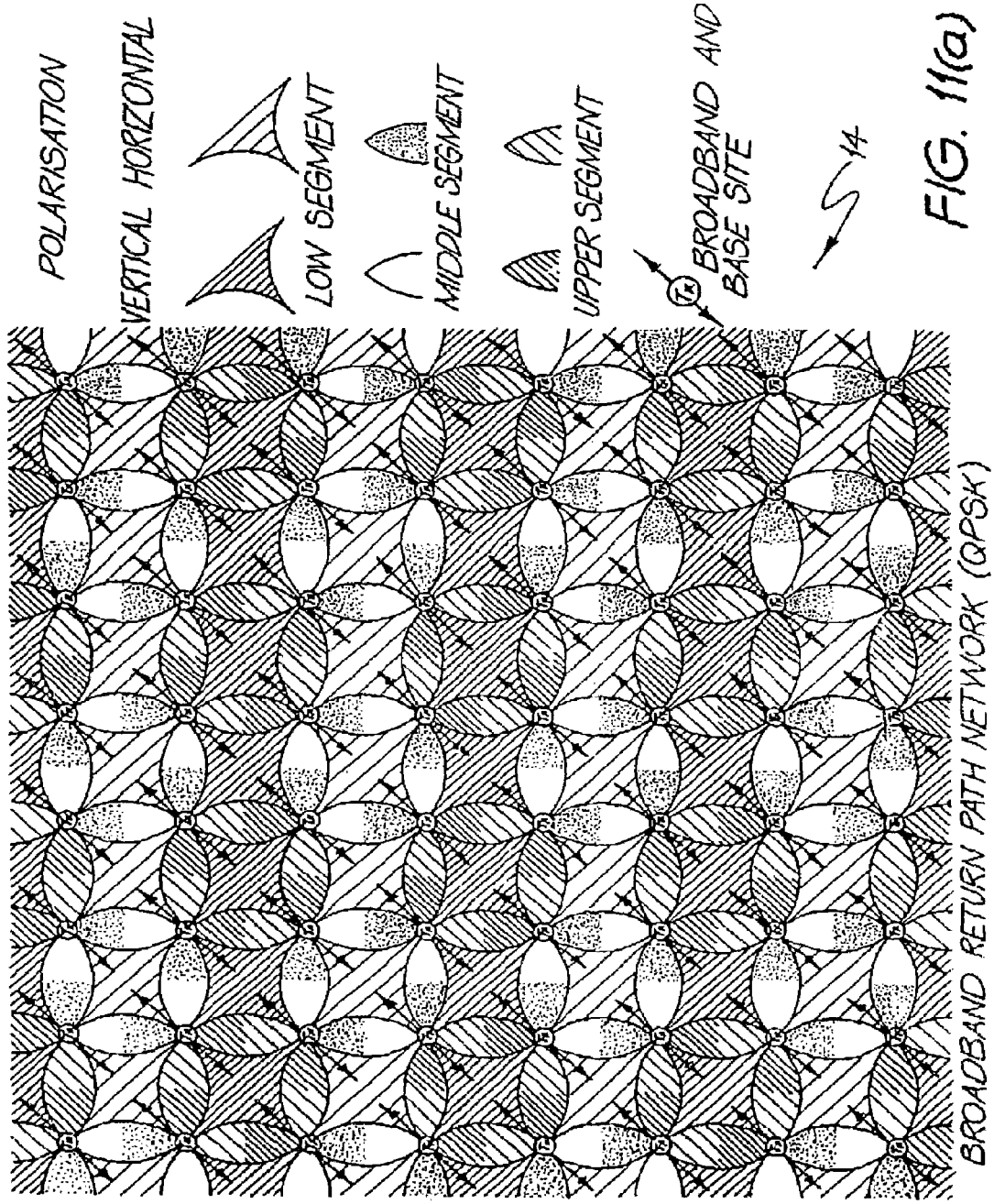
FIG. 11(a) is a schematic view of the network shown in FIG. 3, showing distribution and polarisation of spectrum allocation 'B' as shown in FIG. 5.

Turning to FIGS. 11(a) and 11(b), there is shown a return path arrangement for the broadband network. The segments use frequencies selected from the B spectrum shown in FIG. 5, along with vertical and horizontal polarisation in accordance with FIG. 11(a). In this way, the network arrangement shown in FIG. 11(a) makes relatively good use of the allocated spectrum. Typically, the receivers used for the return path of the broadband network use the same directional horns as the transmitters.

It will be appreciated that the present invention includes within its scope all suitable digital and analog modulation schemes. Similarly, the actual frequencies at which the invention may be applied may vary depending upon terrain and other variables. Whilst these frequencies will typically lie in the range of 10 GHz to 50 GHz, the invention may be implemented with frequencies outside of this range, so long as the signals are sufficiently directional.

Although the invention has been described with reference to a number of particular embodiments, it will be appreciated by those skilled in the art that the invention may be embodied in many other forms.

The invention claimed is:

1. A transmission network for communicating information at directional radio frequencies, said network comprising:

(a) a plurality of first, second, third and fourth cells, each first, second, third and fourth cell comprising:
a first transmitter for transmitting radio frequency information in a first direction to define a first reception footprint substantially within the cell, the first transmitter being; disposed at or adjacent a periphery of the cell, and
a second transmitter far transmitting radio frequency information in a second direction substantially opposed to the first direction to define a second reception footprint substantially overlapping the first reception footprint, the second transmitter being disposed at or adjacent the periphery of the cell at a position substantially opposed to the first transmitter,
the first, second, third and fourth cells being generally circular or oval in plan, of similar size and transmitting at first, second, third and fourth frequencies respectively, the first transmitter of each first cell being disposed at or adjacent the second transmitter of an adjacent second cell, and the first transmitter of each third cell being disposed adjacent the second transmitter of an adjacent fourth cell,
the plurality of cells being arranged such that the first and second directions, in which the first and second transmitters respectively transmit, are parallel;
(b) a first rectangular array of the first and second cells, the periphery of each first and second cell abutting the peripheries of respective surrounding first and second cells, wherein rows of the first rectangular array in a direction parallel to the first and second directions comprise alternating first and second cells, and each of the rows of the first rectangular array orthogonal to the first and second directions includes either first or second cells, and
(c) a second rectangular array of the third and fourth cells, the periphery of each third and fourth cell abutting the peripheries of respective surrounding third and fourth cells, wherein rows of the second rectangular array in a direction parallel to the first and second directions comprise alternating third and fourth cells, and each of the rows of the second rectangular array orthogonal to the first and second directions includes either third or fourth cells,
wherein the cells of the second rectangular array are displaced with respect to the cells of the first rectangular array by approximately the radius of a cell in the first direction, and by approximately the radius of a cell in a direction orthogonal to the first direction.

2. A transmission network according to claim 1, wherein the first, second, third and fourth frequencies are generated by horizontal and vertical polarisation of a first frequency and a second frequency.

3. A transmission network according to claim 1, wherein the network is a broadband, two way network, in which return signals are transmitted from one or more points within the cell.

4. A transmission network according to claim 3, wherein the return signals are transmitted at a frequency other than the first, second, third or fourth frequencies.

5. A transmission network according to claim 1, further including a broadcasting network for one-way broadcasting of information.

6. A transmission network according to claim 5, wherein the broadcasting network includes a plurality of fifth cells and sixth cells, wherein:

each fifth cell includes a fifth transmitter for transmitting radio frequency information in a third direction orthogonal to the first and second directions to define a reception footprint substantially within the fifth cell, the fifth transmitter being disposed at or adjacent a periphery of the fifth cell; and each sixth cell includes a sixth transmitter for transmitting radio frequency information in a fourth direction substantially opposite the third direction to define a reception footprint substantially within the sixth cell, the sixth transmitter being disposed at or adjacent a periphery of the sixth cell.

7. A transmission network according to claim 6, wherein the fifth transmitter of each fifth cell is disposed at or adjacent the sixth transmitter of an adjacent sixth cell.

8. A transmission network according to claim 7, including:
a third rectangular array of the fifth and sixth cells, the periphery of each fifth and sixth cell abutting the peripheries of respective surrounding fifth and sixth cells, wherein rows of the third rectangular array in a direction parallel to the third and fourth directions comprise alternating fifth and sixth cells, and each row of the fourth rectangular array parallel to the first and second directions includes either fifth or sixth cells;

a fourth rectangular array of the fifth and sixth cells, the periphery of each fifth and sixth cell abutting the peripheries of respective surrounding firth and sixth cells, wherein rows of the fourth rectangular array in a direction parallel to the third and fourth directions comprise alternating fifth and sixth cells, and each row of the fifth rectangular array parallel to the first and second directions includes either fifth or sixth cells;

wherein the cells of the fourth rectangular array are displaced with respect to the cells of the third rectangular array by approximately the radius of a cell in the third direction, and by approximately the radius of a cell in the first direction.

9. A transmission network according to claim 8, wherein the cells of the third rectangular array are displaced with respect to the cells of the first rectangular array by approximately the radius of a cell in the first direction.

10. A transmission network according to claim 8, wherein the broadcasting network is an analog network utilising frequency modulation.

11. A transmission network according to claim 10, wherein cells within the third rectangular array are half channel interleaved with cells from the fourth rectangular array.

12. A transmission network according; to claim 8, wherein the broadcasting network utilises a digital modulation scheme.

13. A transmission network according to claim 12, wherein the digital modulation scheme is quadrature phase shift keyed modulation.

14. A transmission network according to claim 6, wherein the information to be broadcast via the broadcasting network is relayed between cells thereof by means of directional receivers and transmitters.

15. A transmission network according to claim 14, wherein the information to be broadcast is relayed at frequencies similar to those used by the broadcasting network.

16. A transmission network according to claim 1, wherein the first, second, third and fourth cells are grouped into clusters, each cluster being connected to a broadband backbone through a single connection point.

17. A transmission network according to claim 16, wherein the cells within each cluster relay information to and from the connection point by means of directional radio frequency transmissions between adjacent cells within the cluster.

18. A transmission network according to claim 17, wherein the directional radio frequency transmissions are relayed at frequencies similar to those used by the broadcasting network.

* * * * *